United States Patent

Choquet

[15] 3,636,260

[45] Jan. 18, 1972

[54] DATA TRANSMISSION SYSTEM

[72] Inventor: Michel F. Choquet, Vence, France

[73] Assignee: International Business Machines Corporation, Armonk, N.Y.

[22] Filed: May 8, 1970

[21] Appl. No.: 35,758

[30] Foreign Application Priority Data

May 16, 1969 France ....................6915338

[52] U.S. Cl. ....................179/15 BC

[51] Int. Cl. ....................H04j 1/20

[58] Field of Search ....................179/15 AP, 15 BC, 15 BW

[56] References Cited

UNITED STATES PATENTS 2,719,189 9/1955 Bennett ....................179/15 BC

*Primary Examiner*—Ralph D. Blakeslee

*Attorney*—Hanifin and Jancin and Robert B. Brodie

[57] ABSTRACT

A plurality of phase-modulated signals are multiplexed upon a transmission line by the formation of a suitable summed composite signal. An algebraic analog adder is used to combine over an appropriate signal space the modulation product formed from two alternately selected and modulated signals selected from a serial data stream.

4 Claims, 12 Drawing Figures

DATA TRANSMISSION SYSTEM

BACKGROUND OF THE INVENTION

This invention relates to digital data transmission systems, and more particularly to the multiplex transmission encoding of digital data suitable for use, for example, on telephone transmission lines.

It is known that a flat band pass characteristic of a transmission line will not distort the frequency components of signals which lie within the band. Such flat pass bands may be only a few kilohertz in width. A typical voice grade quality telephone line has a bandwidth lying between 300 to 3,000 kilohertz.

Consider now the transmission line in relation to digital data. In the simplest case, digital data can be represented upon such a line by a series of unipolar pulses whose presence or absence correspond to the 1's and 0's of the binary digital message. If the pulses have equal time duration and there is no time separation between them, then they may require timing coordination at both the transmitter and receiver. Additionally, unipolar signals contain a DC component that is difficult to transmit. This component contains no information and certainly wastes power. In contrast, a bipolar pulse, such as a positive-going pulse followed by a negative-going pulse, avoids some of these difficulties. As, for example, the bipolar pulse has a zero DC component. Conveniently, a binary 1 may represent a positive-negative bipolar pulse while a binary 0 may be represented by the same signal 90° out of phase.

It has been observed that a signal of the form ($k \sin \omega t/\omega t$) tends in the limit to have the effect of combining a frequency near the lower end of the transmission line frequency pass band with its harmonics throughout the pass band. This yields a resultant signal which can pass through the transmission line without unacceptable distortion. In view of the overwhelming volume of digital data generated by contemporary digital computers, it would be most efficacious if the continuous function ($\sin \omega t/\omega t$) could be represented by a digital pulse amplitude approximation. To this extent the data transmission system shown and described in copending U.S. Pat. application Ser. No. 667,203, filed Sept. 12, 1967, to J. M. Pierret illustrates such a digital substitution. The digital approximation consists of a central pulse and a group of smaller pulses (called echoes) which are both timed and weighted and precede and trail the central pulse. While the timing of central pulses and echoes may overlap in the case of several data sources or encoders, the question arises as to combining several of them so more than one data source may be encoded upon a line or channel.

It is, accordingly, an object of this invention to devise a digital transmission encoder for multiplexing the output of a plurality of data sources onto a transmission line. It is a more specific object of this invention to devise an encoder for multiplexing a plurality of signals digitally approximating the function ($\sin \omega t/\omega t$) with the minimum of information loss and distortion.

SUMMARY OF THE INVENTION

It was unexpectedly observed that binary digital signals approximated by the form ($q \sin(\omega t)/(\omega t)$ ($q$ algebraically being equal to $\pm 1$) could be conveniently and easily multiplexed on a transmission path if signals from one signal source were modulated and summed to form a signal $$\left[\frac{q \sin(\omega t)}{(\omega t)}\right] \cos(2\omega t)$$

and signals from another signal source were likewise modulated and summed to form a signal $$\left[\frac{q' \sin(\omega t)}{(\omega t)}\right] \sin(2\omega t)$$

which signals were in turn algebraically combined and imposed upon the transmission path. Thus, data elements A, B, C and D occurring at a rate of 1/T are alternately applied to corresponding input to the transmitter encoder. Thus, data elements A, C, E...are applied to the first input and data elements B, D, F...are applied to the second input. The data elements on channel or input 1 are approximated by the encoder according to $$\frac{q \sin(\omega t) \cos(2\omega t)}{\omega t}$$

where $\omega$ is $\pi/2T$. Likewise, the data elements at the second encoder input are approximated by the encoder 90° out of phase by signals of the form $$\frac{q' \sin(\omega t)}{\omega t} \cos(2\omega t)$$

It should be noted that $q'$ is an algebraic number assuming the values of $\pm 1$ corresponding to the binary value of the data element.

as successive elements are encoded from a first and second digital data source.

Figure 1A:
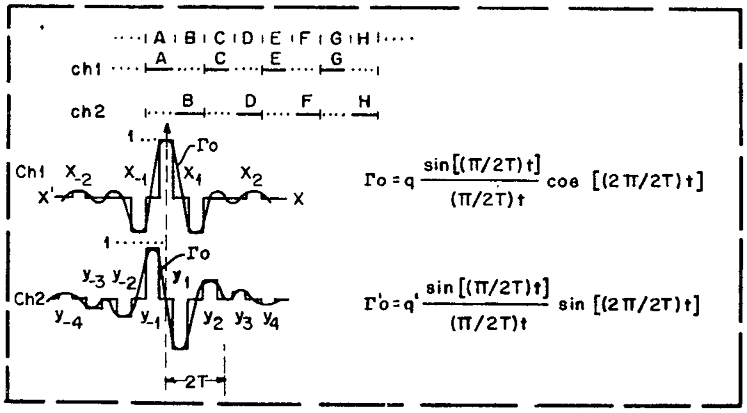
FIGS. 1*a*, 1*b* and 1*c* illustrate the approximation of data elements by signals of the form $$\frac{\sin \omega t}{\omega t} \cos 2\omega t$$
Figure 1B:
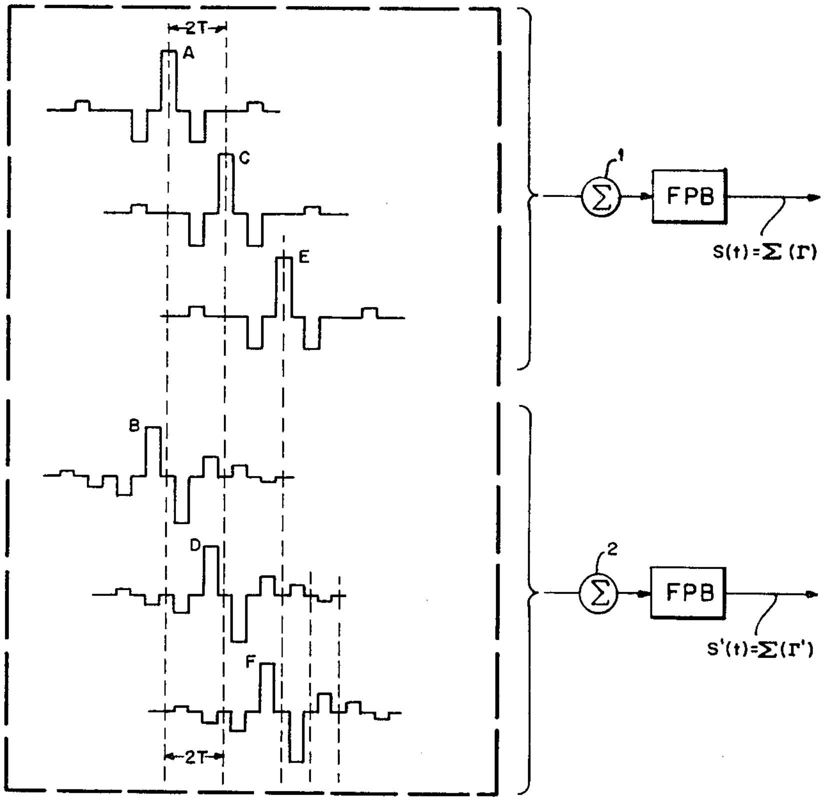
Figure 1C:
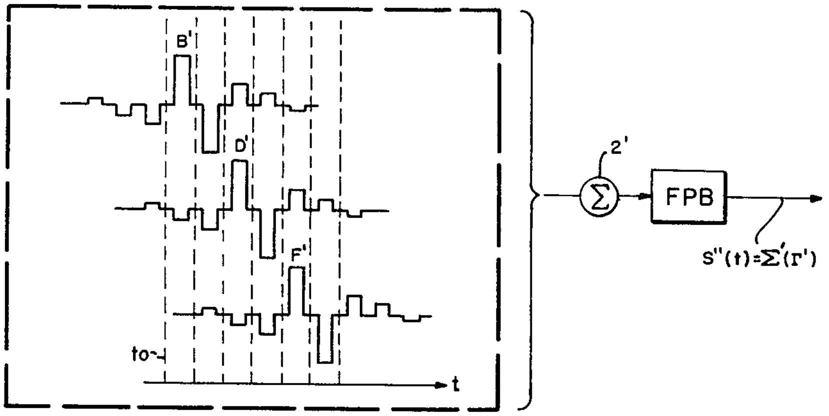
Figure 2A:
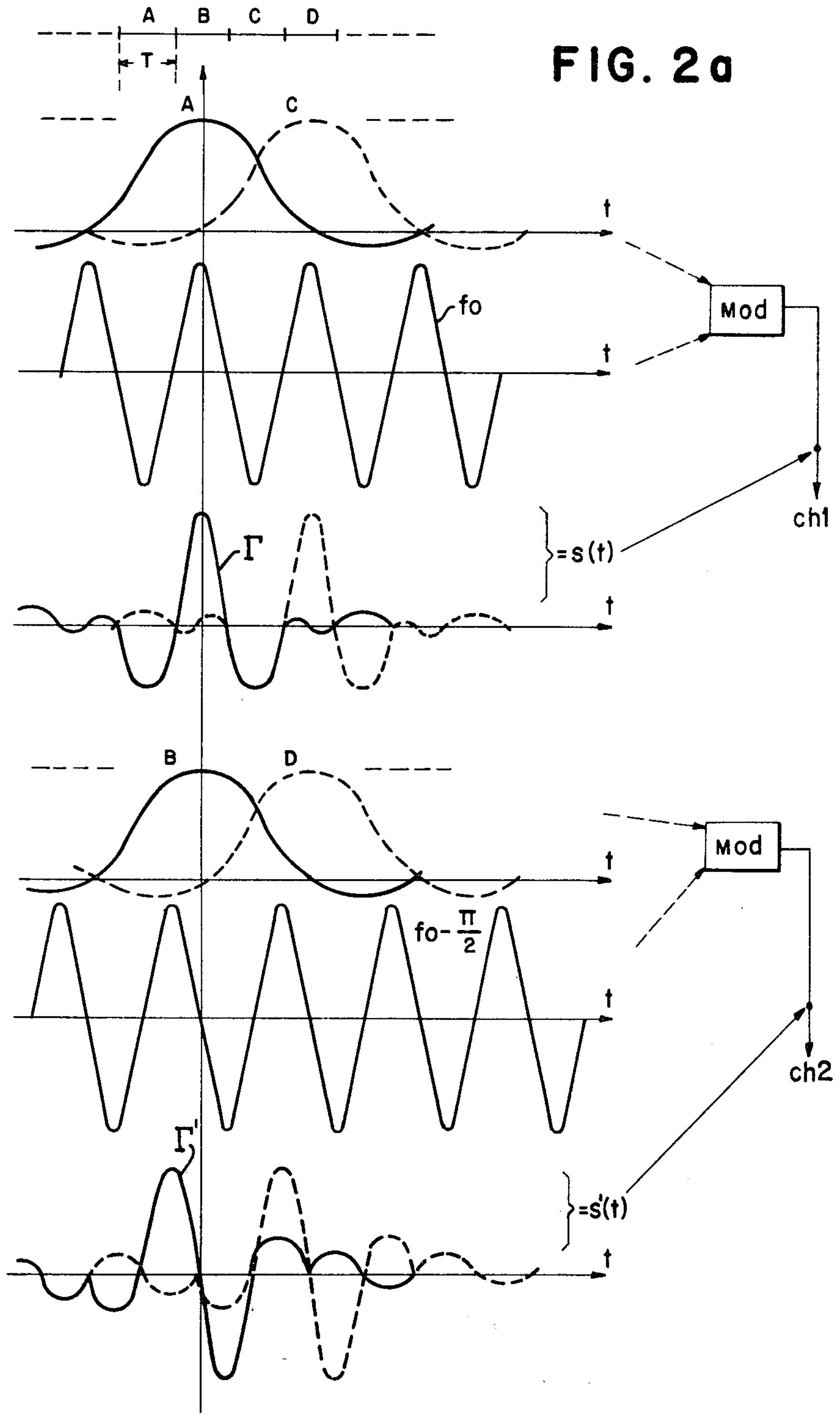
Figure 2B:
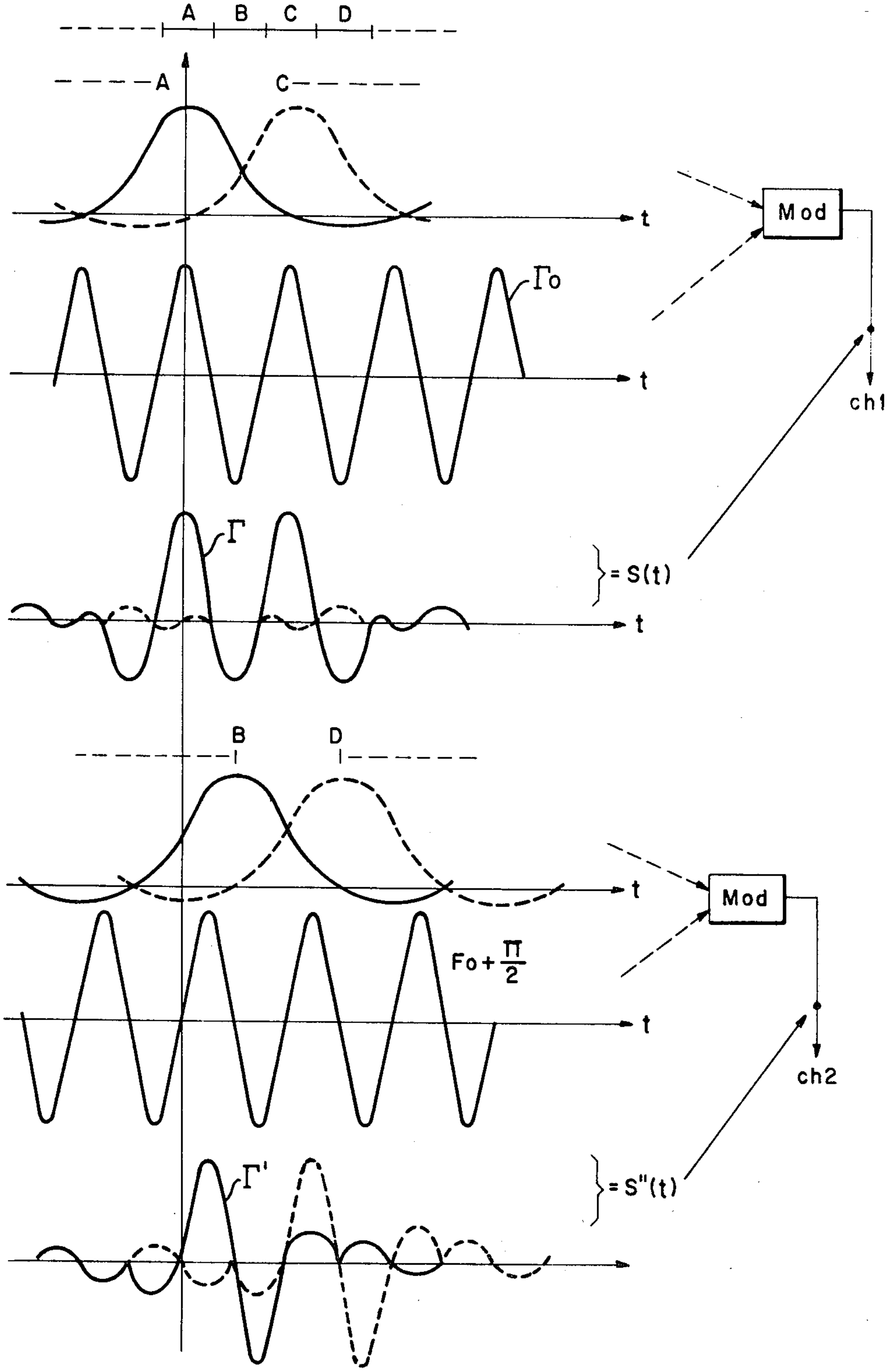

FIGS. 2*a* and 2*b* show the formation of a progressive summation signal for the signals as progressively encoded in FIGS. 1*a*—1*c*.

Figure 3:
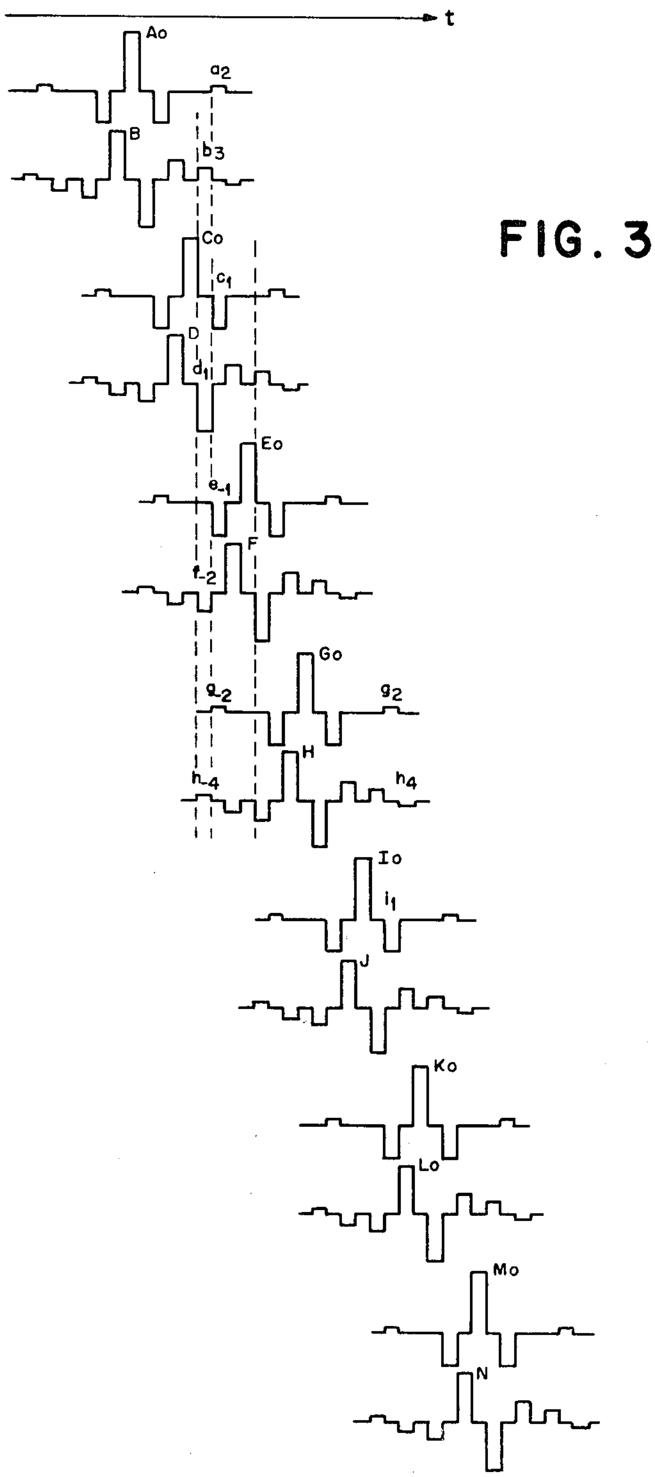

FIG. 3 shows the progressive effect of summation on the distribution of the "echoes" in the digitalized approximation of the ($\sin \omega t/\omega t$) functions and as is also seen in FIG. 1*c*.

Figure 4:
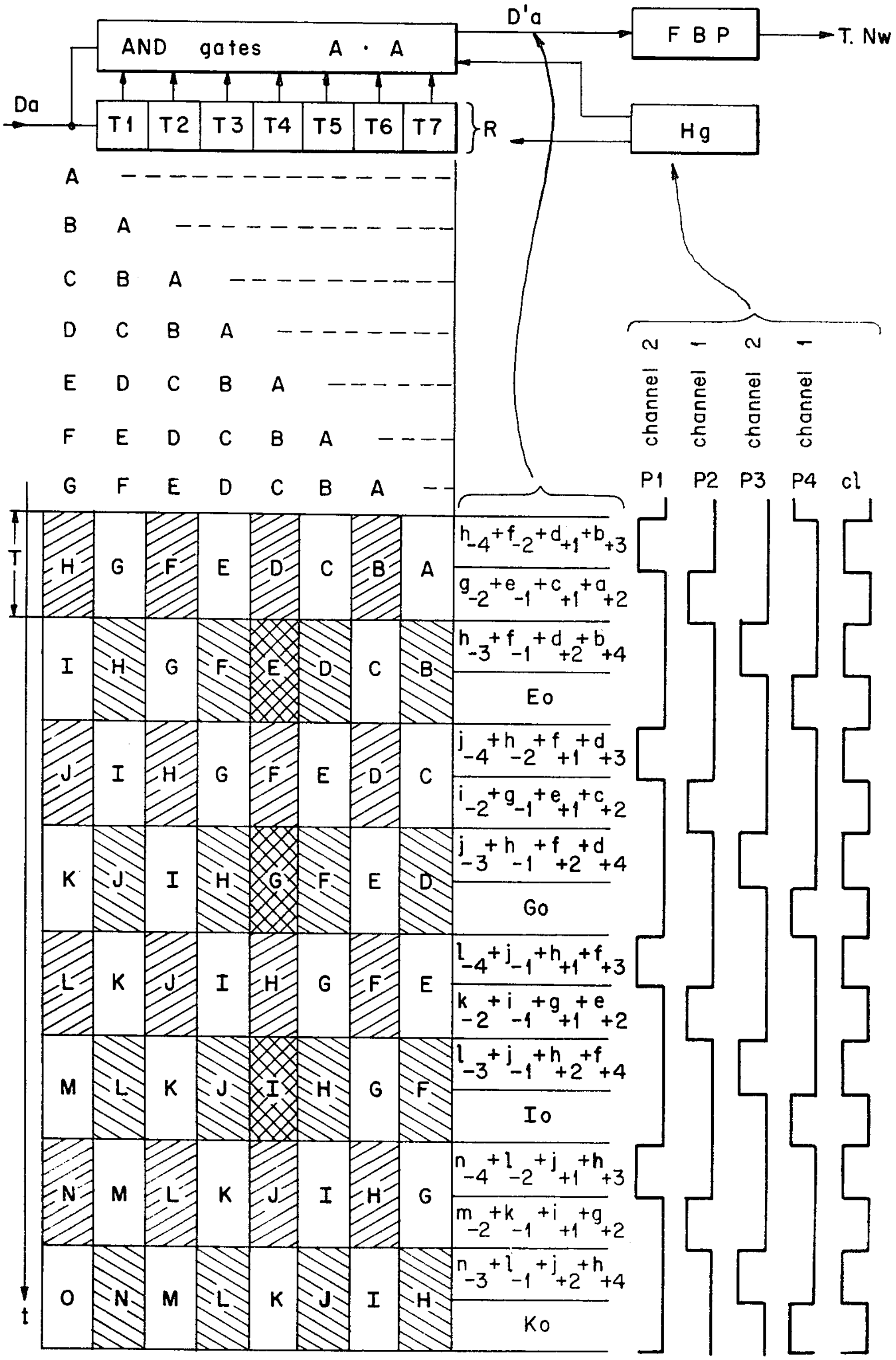

FIG. 4 is a diagrammatic representation of the encoder emphasizing the progression of signals therethrough.

Figure 5:
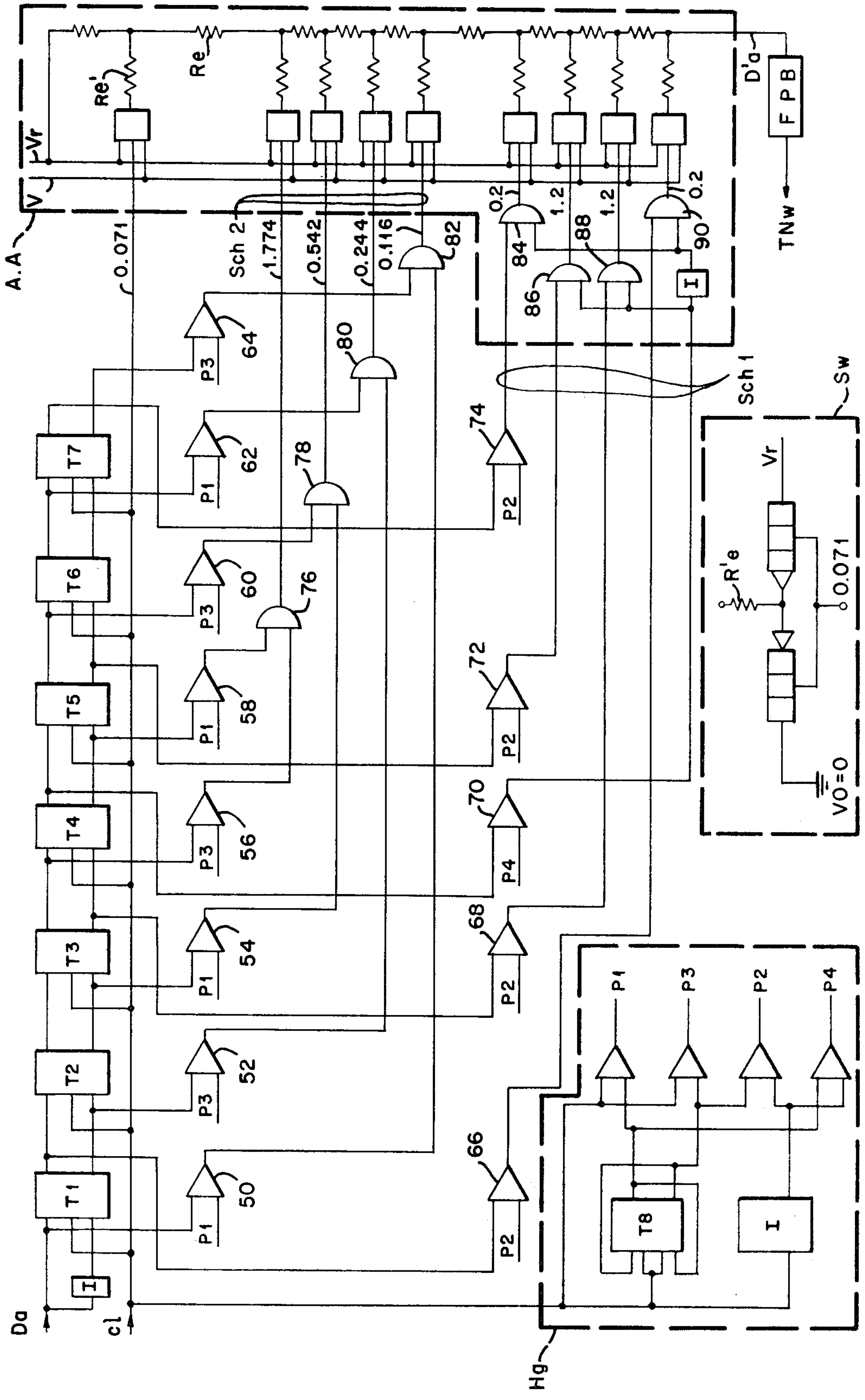

FIG. 5 is a schematic embodiment of one form of the invention.

Figure 6A:
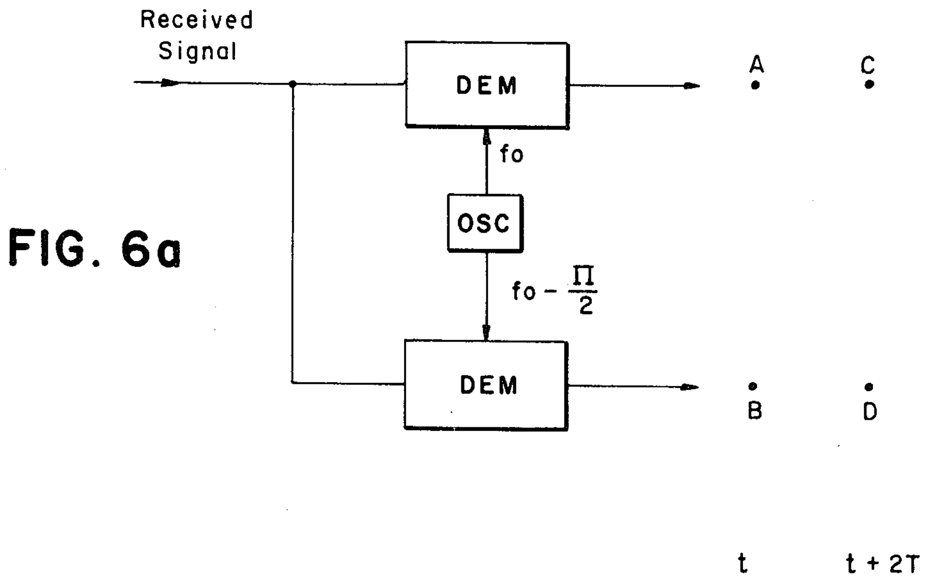
Figure 6B:
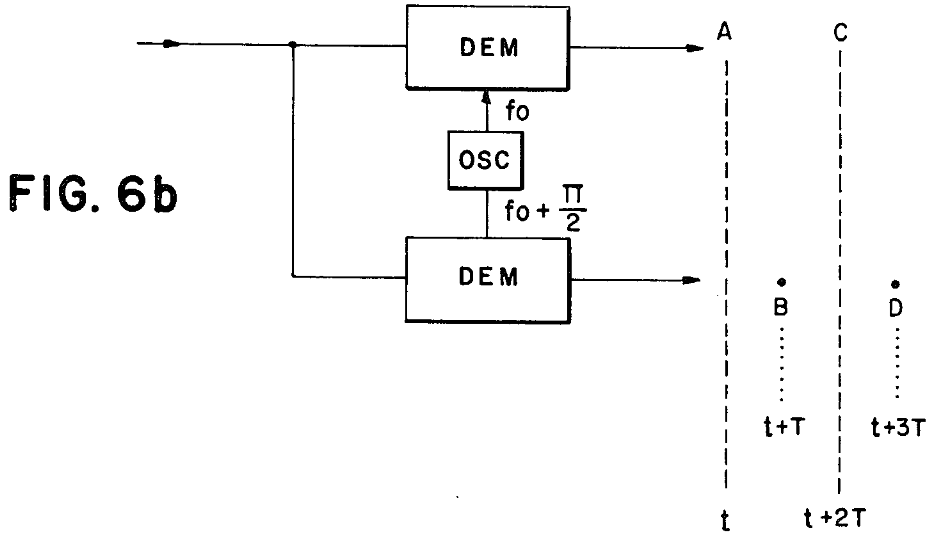

FIGS. 6*a* and 6*b* illustrate the receiver in block form.

Figure 7:
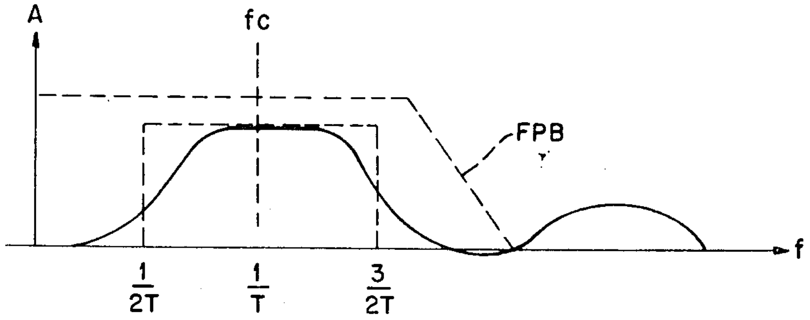

FIG. 7 is an illustrative spectral distribution.

Figure 8:
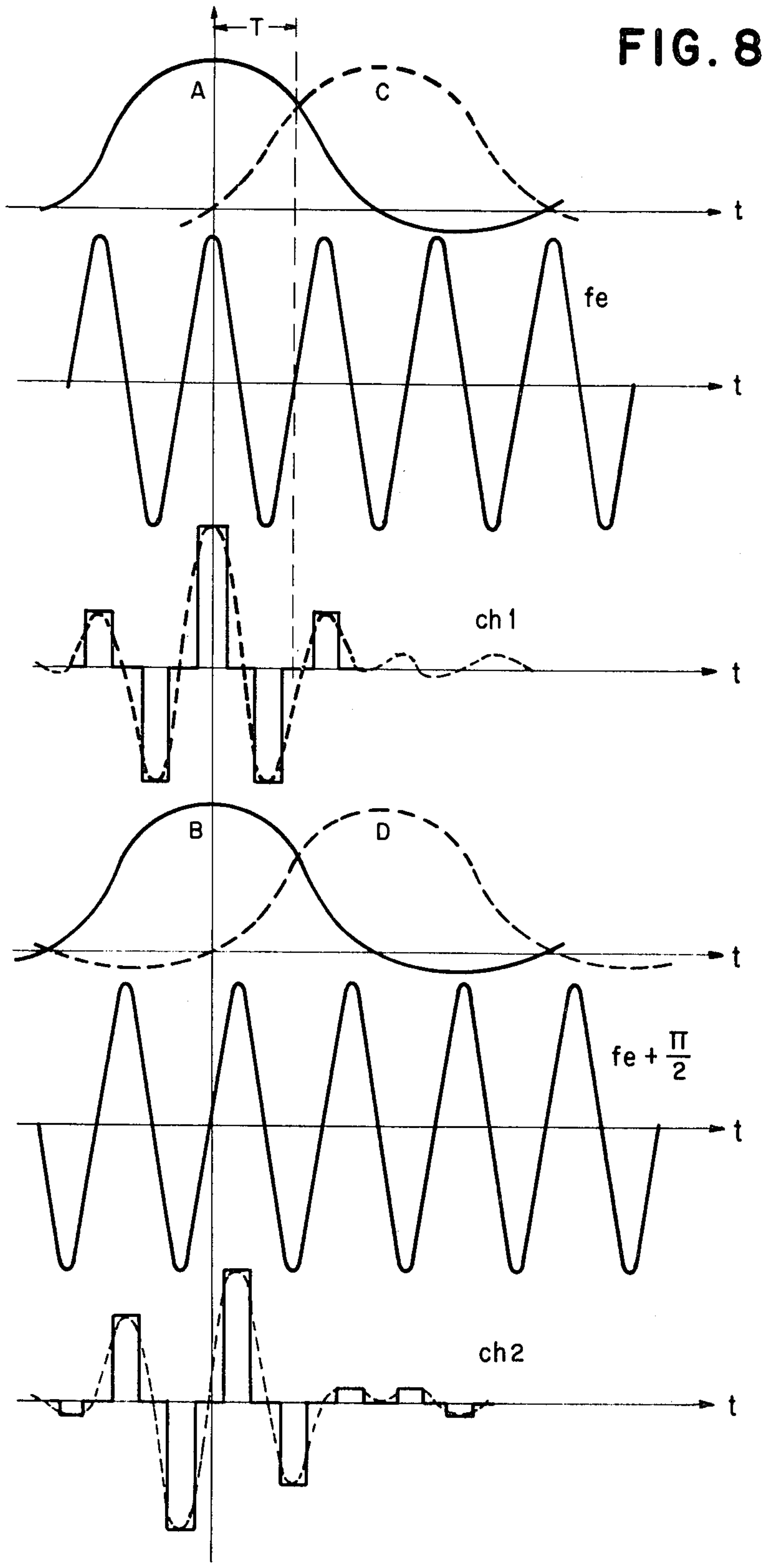

FIG. 8 shows another signal ensemble.

DESCRIPTION OF THE PREFERRED EMBODIMENT

Referring now to FIG. 1*a* of the drawing, there are shown representative data elements A, B, C D...which are to be applied at the transmitter encoder input at a data rate of 1/T. In this embodiment, the data elements are considered as being taken alternately or two at a time. Thus, data elements A, C, E...are applied to data input channel 1 while data elements B, D, F...are applied to the second input channel. Each data element appearing on channel 1 is approximated by a signal of the form $$q \frac{\sin(\omega t)}{\omega t} \cos(2\omega t)$$

where as previously mentioned $q$ is an algebraic number assuming a value of either $\pm 1$ corresponding to the binary value of the data element and $\omega$ is equal to $\pi/2T$. The digital approximation to this function includes a dominant central pulse and a cluster of smaller weighted preceding and trailing pulses, which are termed "echoes." In a like manner, each data element on channel 2 is represented by the digital approximation of the function $$q' \frac{\sin(\omega t)}{\omega t} \cos(2\omega t)$$

where $q'$ likewise assumes the binary value of the corresponding data element. It is apparent that the encoding signal on channel 1 is symmetric about a central axis while the encoding signal on channel 2 is 90° out of phase. The so-called "echo" pulses are designated with subscripts. Thus, pulses $x_1$, $x_2$ occur subsequent in time to the main pulse $x$ with the pulses $x_{-1}$ and $x_{-2}$ occurring prior in time to main pulse $x$.

Referring now to FIGS. 1*b* and 1*c*, there is shown the serial progression in time of the encoding pulses. The encoder algebraically combines the signals as they are applied to each input. What this imports is that each signal has a number of echo pulses, both positive and negative-going, which overlap the echo pulses, of the next successively encoded signal. In FIG. 1*b* the signals A, C, E are algebraically summed and appear at output 1 while the algebraic summation of signals B, D, and F appear at the output of adder 2. The summed signals are applied through corresponding low-pass filters for smoothing purposes.

Referring now to FIG. 1*c*, there is shown a composite or summary of the algebraic combination of the signals summed on channels 1 and 2.

Referring now to FIGS. 2*a* and 2*b*, there is shown in greater detail the different steps for generating each signal on, for example, the first channel and for generating a succession of signals in analog form. Now at the top of the figure data elements A, B, C and D are represented. Data elements A and C encoded on channel 1 have their central pulses symbolically represented. These central pulses occur at a rate of $\omega t$ and modulate a sinusoidal carrier of frequency 2 $\omega t$. The signal designated S($t$) represents a summation of A modulating the carrier and C modulating the carrier. Mathematically, the modulated signal relative to A is, of course, $$\frac{q \sin\left(\frac{\pi}{2T}\right)t}{\frac{\pi}{2T}t} \cos\left[\left(\frac{2\pi}{2T}\right)t\right]$$

for the expression relative to data element C. It is represented by $$\frac{q \sin\left[\left(\frac{\Pi}{2T}\right)(t-2T)\right]}{\frac{\Pi}{2T}[t-2T]} \cos\left(\frac{2\Pi}{2T}\right)t$$

Therefore, the summed signal S($t$) is expressed as $$\sum_{i=-\infty}^{\infty} q_i \frac{\sin\left|\left(\frac{\Pi}{2T}\right)(t-2iT)\right|}{\left(\frac{\Pi}{2T}\right)(t-2iT)} \cos\left(\frac{2\Pi}{2T}\right)t$$

The same analysis can be applied with respect to the summation signal S′($t$) in which alternate data elements B and D, for example, individually modulate a carrier displaced by 90°. It follows that the summary terms are the same except that the S′ contains $$\sin\left|\left(\frac{2\Pi}{2T}\right)t\right|$$

for the carrier.

Referring now to FIG. 3, there is considered anew the signal distribution shown in FIG. 1*b*. However, FIG. 3 exhibits a larger number of data elements having as a purpose to make evident the duration and effect over which the digital signal extends and further to determine the data elements which are involved in the final composite signal at any given instant. Consider, for example, data element H. Its echo pulses occur for time periods T on either side of the main pulse. Data element F acts through at least two time periods on either side of the main pulse.

In order to accurately determine the values to be assigned to each of the data elements, the prior values such as, for example, F, D, B, must be known at the time that H is applied to the transmission line. In this regard, consideration must also be given to the embodiment shown in FIG. 4.

As previously mentioned, at the time when data element H is acting through $h_{-4}$, F is also acting through $f_{-2}$, D through $d_1$, and B is acting through $b_3$. In order to accurately determine the above elements, the values of F, D and E must still be known when H appears over the input line $D_a$ of the data elements to be transmitted. At that time $g_{-2}$, $e_{-1}$, $c_1$ and $a_2$, and after that $h_{-3}$, $f_{-1}$, $d_2$, $b_2$ and then finally $E_0$ are to be simultaneously obtained. A shift register R and then analog adding circuits A...A as set forth in FIG. 4 are used to generate the appropriate composite signals. The signals shown in FIG. 3 illustrate the progression of values of data applied to path $D_a$ to be transmitted in different positions into register R. The composite signal appearing on the output of analog adding circuits AA is designated $D'_a$. Adding circuits AA are formed from a plurality of AND and OR gates such as may be found in any standard reference on logical design as, for example, *Logical Design for Digital Computers*, by Montgomery Phister, Jr., John Wiley & Sons, New York, 1958, Chapter 2.

Broadly, a clock $C_1$ located in clocking and distributor logic circuit $H_g$ provides the timing and reference gating signals P1, P2, P3 and P4. This controls the adding circuits with reference to combining one or more of the contents of the various stages of shift register R with the signal magnitude present on path $D_a$.

Referring now to both FIGS. 3 and 4, it can be observed that at the time when data element H appears on line $D_a$ the value $h_{-4}+f_{-2}+d+b_3$ appear on line $D'_a$ during the time interval T/2 defined by timing pulse P1. During the following time interval T/2 the composite signal $g_{-2}+e_{-1}+c_1+a_2$ appears on output line $D'_a$. It may also be observed that when H is on the input line $D_a$, then the data elements F, D, B, and G, E, C, and A are in the respective flip-flops T2, T4, T6, and T1, T3, T5, and T7.

Referring now to FIG. 5, there is shown a more detailed embodiment for register R and for analog adder AA. The flip-flops of register R are in cascade and are driven by the input on line $D_a$ and by the clock input $C_1$. This clock input also drives the analog adder AA and the timing circuitry in $H_g$. The timing interval outputs defined by the signals on paths P1 through P4 regulate the output gates 50 through 74. Gates 76 through 90 selectively combine signals gated through the first level and drive corresponding inputs to the resistive algebraic adder AA. It should be readily apparent to one skilled in the logical design art that various and sundry weighting schemes may be employed to achieve both a positive and negative-going DC range within which a suitable composite signal may be formed. In this regard, the diagrammatic embodiment shown in FIG. 5 is considered merely illustrative of numerous types of logic and algebraic combining circuits. For example, it can be seen in FIG. 4 that the sending of the pulse train represented by $g_{-2}+e_{-1}+c_1+a_2$ are represented by sampling the outputs of flip-flops T1, T3, T5 and T7. If the succession of the data is G, E, C, A such that the elements $g_{-2}$, $e_{-1}$, $c_1$, and $a_1$, are all negative, then there will be obtained the minimum level which must be reached for the negative output embraced by the leads contained within "Sch1" and simultaneously for the minimum DC condition of the outputs contained within the ones labeled "Sch2."

Referring now to FIGS. 6*a* and 6*b* of the drawings, there is shown a representative demodulator for separating in phase the corresponding elements of the composite signal. Such demodulation is, of course, well known in the communications art and reference for a typical and useful design may be found in Modulation 3 by Black, Bell Telephone Laboratory Series and also in Transmission Systems for Communications, also by Bell Telephone Laboratories, copyright 1964 at pages 380–384.

Having described and shown an embodiment of the invention, various other embodiments may be envisioned by one having skill in this art in view of this disclosure. Thus, changes in the form and details may be made therein without departing from the spirit and scope of the invention.

What is claimed is:

1. In a data transmission system having a transmitter, receiver, and a coupling medium therebetween and further having means at the transmitter for encoding a sequence of individual data elements A, B, C, D, E, etc., occurring at a predetermined data rate T with corresponding signals of the general form ($k \sin \omega t/\omega t$), $\omega$ being $2\pi/T$ wherein said encoding means comprise:

a source of carrier signals of frequency $n$;

means for partitioning the data element sequence into a first group such as is defined, for example, by alternate elements A, C, E, etc., and into a second group such as is defined, for example, by alternate elements B, D, F, etc.;

means for modulating each first group data element by a signal of form $$\frac{q \sin \omega t}{\omega t} \cos nt$$

and for modulating each second group data element by a signal of the form $$\frac{q' \sin \omega t}{\omega t} \sin nt$$

where $q$ and $q'$ are magnitudes corresponding to the data element value; and means for forming a composite transmission signal from the modulated signals summed over the signal space $i$ defined by $$\sum_i \frac{q_i \sin \omega\left(t-\frac{i\Pi}{\omega}\right)}{\omega\left(t-\frac{i\Pi}{\omega}\right)} \cos nt+\sum_i \frac{q_i' \sin \omega\left(t-\frac{i\Pi}{\omega}\right)}{\omega\left(t-\frac{i\Pi}{\omega}\right)} \sin nt$$

2. In a data transmission system having a transmitter, receiver, and a coupling medium therebetween, and further having means at the transmitter for encoding a sequence of individual data elements A, B, C, D, E, etc., occurring at a predetermined data rate T with corresponding signals, each of the corresponding signals being formed from a weighted sequence of pulses approximating the form ($\sin \omega t/\omega t$), $\omega$ being $2\pi/T$ and whose frequency components lie within a predetermined octave of the transmission band, wherein said encoding means comprise:

a source of carrier signals of frequency $n$;

means for partitioning the data element sequence into a first group such as is defined, for example, by alternate elements A, C, E, etc., and into a second group such as is defined, for example, by alternate elements B, D, F, etc.;

means for forming a modulation product of the signals representing the corresponding first group data element ($q \sin \omega t/\omega t$) with the carrier cosin $nt$, and for forming the modulation product of the signal representing each corresponding second group data element ($q' \sin \omega t/\omega t$) with the carrier sin $nt$, where $q$ and $q'$ are magnitudes corresponding to the data elements value; and means for forming a composite transmission signal from the modulated signals summed over the signal space $i$ defined by $$\sum_i \frac{q_i \sin \omega\left(t-\frac{i\Pi}{\omega}\right)}{\omega\left(t-\frac{i\Pi}{\omega}\right)} \cos nt+\sum_i \frac{q_i' \sin \omega\left(t-\frac{i\Pi}{\omega}\right)}{\omega\left(t-\frac{i\Pi}{\omega}\right)} \sin nt$$

3. In a data transmission system according to claim 2, wherein the encoder comprises:

a shift register having at least the same number of stages as the number of weighted pulses used in the ($\sin \omega t/\omega t$) signal;

an analog algebraic adder;

a logic arrangement coupling the outputs of selected register stages to selected adder elements in a predetermined manner; and clocking and timing circuits for transferring the contents of the shift register at frequency 1/T and for gating appropriate elements of the logic arrangement whereby individual pulses of each weighted sequence are caused to overlap in time.

4. In a data transmission system of the phase modulation type in which a series of weighted pulses approximating the form ($\sin \omega t/\omega t$) are used to represent individual and corresponding data elements, the combination comprising:

a carrier signal source of frequency $n$;

means for forming a modulation product $$\frac{q \sin \omega t}{\omega t} \cos nt$$

from a first group of alternate ones of the sequence of data elements, and for forming the modulation product $$\frac{q' \sin \omega t}{\omega t} \sin nt$$

from a second group of alternate ones of the sequence of data elements, where $q$ and $q'$ represent the binary magnitudes corresponding to the binary data element value, T is the data rate of the data elements and $\omega$ being $2\pi/T$; and means for forming a composite transmission signal from the modulated product signals summed over the signal space $i$ defined by $$\sum_i \frac{q_i \sin \omega\left(t-\frac{i\Pi}{\omega}\right)}{\omega\left(t-\frac{i\Pi}{\omega}\right)} \cos nt+\sum_i \frac{q_i' \sin \omega\left(t-\frac{i\Pi}{\omega}\right)}{\omega\left(t-\frac{i\Pi}{\omega}\right)} \sin nt$$

* * * * *